April 17, 1962 E. G. HITCH ET AL 3,030,445

COMMUNICATION SYSTEMS

Filed June 23, 1959 2 Sheets-Sheet 1

INVENTORS

ERIC GIBBON HITCH
BRIAN ALBERT PELLS
CLIFFORD HENRY JAMES FLEETWOOD

BY Larson and Taylor

April 17, 1962 E. G. HITCH ET AL 3,030,445

COMMUNICATION SYSTEMS

Filed June 23, 1959 2 Sheets-Sheet 2

INVENTORS

ERIC GIBBON HITCH
BRIAN ALBERT PELLS
CLIFFORD HENRY JAMES FLEETWOOD

BY Larson and Taylor 3,030,445

COMMUNICATION SYSTEMS

Eric Gibbon Hitch, Middlesex, and Brian Albert Pells and Clifford Henry James Fleetwood, London, England, assignors to Siemens Edison Swan Limited, London, England, a British company Filed June 23, 1959, Ser. No. 822,279
Claims priority, application Great Britain July 11, 1958
6 Claims. (Cl. 179—1)

Figure 1:
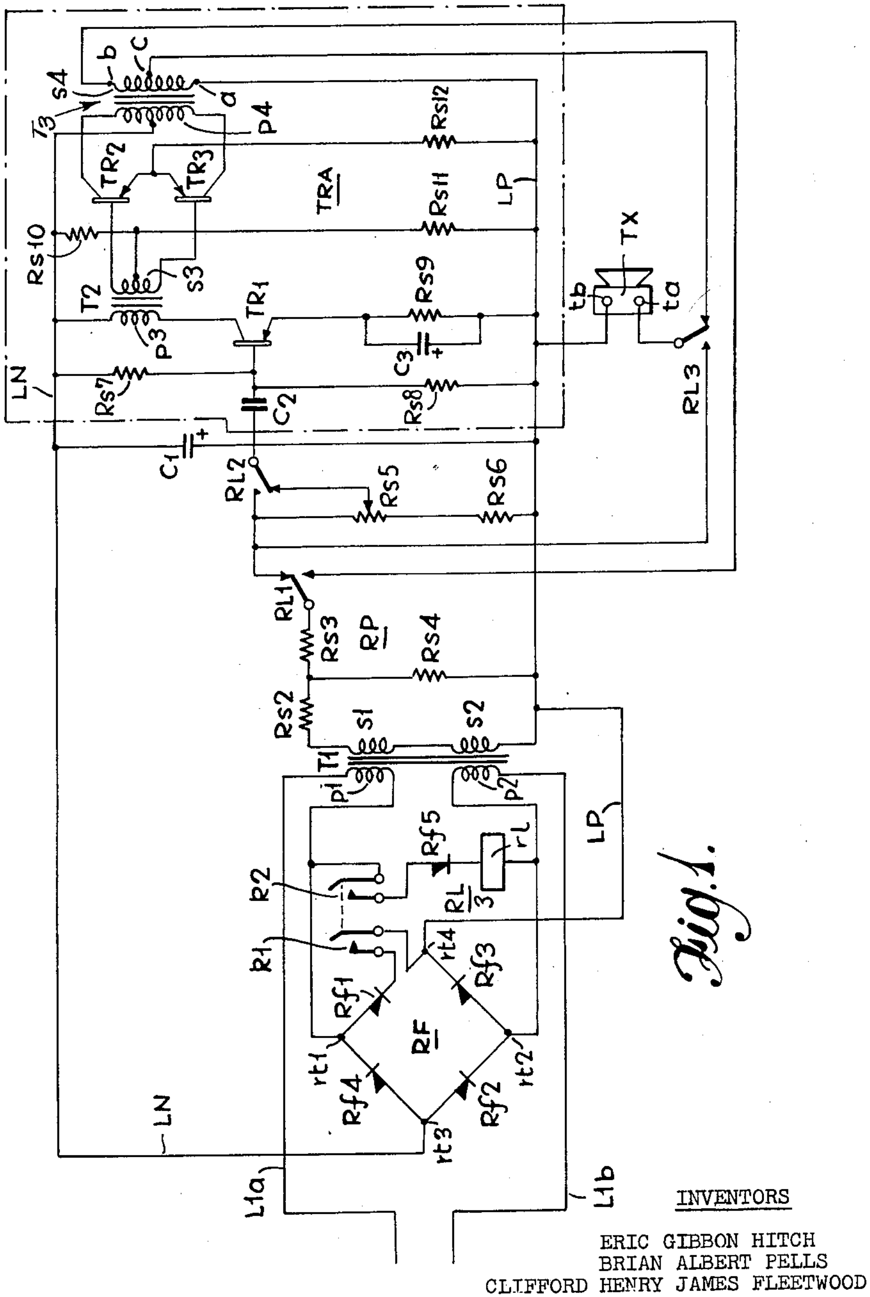

This invention relates to communication systems permitting the transmission between spaced locations of intelligence in the form of electrical signals, and more particularly to such a system of the kind in which a so-called "master" equipment is connected to at least one "extension" equipment for communication therewith and wherein the transmission of intelligence between the master equipment and an extension equipment can be effected in only one direction at any time. The connection between master and extension equipments may be made over a single line wire and completed by way of an earth return circuit. With this mode of connection, however, excessive cross-talk may be received at the equipments due to the induction into the single wire of unwanted signals. For this reason it may usually, though not necessarily always, be preferred to provide between the equipments a two-wire connection which is balanced about earth, since unwanted signals would then tend to be induced equally into the two line wires, being of the same polarity with respect to earth, and would thus tend to cancel each other in the balanced two-wire connection to give an appreciable decrease in the resultant cross-talk present therein.

It is not uncommon in a communication system of the above kind for the connection between master and extension equipments to be made over "land-lines," that is line wires leased from a national or other telephone authority. Where this is the case, however, it may be necessary when designing the system to take into consideration certain requirements governing the use of land-lines, which requirements, inter alia, may specify the maximum electrical energy that land-lines are permitted to carry.

Consequently, if the system is to provide speech communication on a broadcast basis in both directions, that is, audio reception is to be effected at both master and extension by means of loudspeakers, the energy level required by intelligence signals, in order to actuate a loudspeaker to produce the desired audio output therefrom, may be higher than the maximum energy level allowed to be transmitted over the land-lines. In such a circumstance, therefore, "loudspeaker-to-loudspeaker" working may be provided for by including at both the master equipment and the extension equipment respective amplifying means which serve to amplify outgoing intelligence signals to an energy level commensurate with that permitted for transmission and also to amplify incoming signals to a yet higher energy level suitable for actuating the loudspeakers. The amplifying means can also provide compensation for attenuation of the transmitted signals by the land-line, such compensation being required particularly if the master and extension equipments are a considerable distance apart and a relatively long land-line is needed to interconnect them. As regards such amplifying means in the extension equipment, the provision of a suitable energy supply for it at the location of the extension equipment is inconvenient and tends to be costly, especially where a considerable number of extensions are involved. With the same amplifying means used for both transmission and reception in the extension equipment, some form of switching being provided for establishing connection to the amplifying means according to the function required of it at any time, it may also be desirable for the switching to be under control of the master equipment so that, for instance, the extension equipment can only be set for transmission when permitted to do so by the master equipment and is at other times set for reception: the master equipment would then be able to transmit to the extension at any time.

An object of the invention is to avoid the requirement for a separate energy supply at the or each extension equipment, while at the same time permitting the extension equipment to be under control of the master equipment, all without using more line connections than are required for the transmission of intelligence between them.

With this object in view it is now proposed in accordance with the present invention that the amplifying means in the extension equipment, having two, alternative, modes of connection for respectively amplifying incoming and outgoing A.C. intelligence signals, shall be energisable by D.C. energy fed to it from the master equipment over the same line connection as is used for the transmission of the intelligence signals, and that the extension equipment shall also include a switching device which is operable in response to one polarity of said D.C. energy, but not in response to the opposite polarity, to change the connection of the amplifying means from one of said modes to the other. In this way the master equipment can control the connection of the extension equipment amplifying means for amplification of incoming or outgoing signals, that is, for transmission or reception, simply by determining the polarity of the D.C. energy which it feeds to the extension equipment. As will be appreciated, appropriate means such for instance as a rectifier bridge, would have to be included in the extension equipment in order to ensure that the D.C. energy as applied to the amplifying means will be of the correct polarity for its operation, irrespective of the polarity of the energy as actually received from the master equipment.

In carrying out the invention, it is contemplated that the amplifying means in the extension equipment would advantageously be a transistor amplifier so that the D.C. energy required to be supplied from the master equipment can be kept to a minimum. Preferably, such amplifier would include at least two transistors connected in push-pull and giving Class A amplification: this would reduce the modulation of the D.C. energy and so simplify feed-back problems.

Suitably the switching device in the extension equipment may be a relay operable by the D.C. energy and controlling change-over contacts effective to provide appropriate switching of input and output circuits of the amplifying means according as the extension is to be set for transmission or reception, such relay being polarised, as by means of a half-wave rectifier connected in series with an energizing winding thereof, so that it operates only when the D.C. energy is of requisite polarity. With this arrangement, a single electroacoustical transducer may be employed which is normally connected to an output circuit of the amplifying means to function as a loudspeaker, but which by operation of the relay change-over contacts referred to can be connected instead to an input circuit of the amplifying means to function as a microphone. Instead of using a polarised relay as the switching device, it is possible that a switching arrangement of an electronic nature, for instance one employing transistors, might be used.

In order to prevent the master equipment from overhearing the extension without the sanction of the latter, as could happen if the extension equipment could be set for transmission under control of the master equipment alone, it may be desirable to provide the extension equipment with some means which require to be operated by a person at the extension before amplifying means thereat can be set for transmission. To this end the extension equipment may include a control switch which, unless it is operated, prevents the switching device from responding irrespective of the polarity of the received D.C. energy.

As regards the master equipment, the reversal of the polarity of the D.C. energy may be effected therein by means of polarity reversing contacts controlled by a switching relay or other changeover means which itself is controlled by contacts of a receive/transmit switch. Amplifying means, preferably a transistor amplifier, and a dual-purpose transducer, similar to those provided for the extension equipment may be provided for the master equipment also, with further contacts of the receive/transmit switch serving to provide appropriate switching of the input and output circuits of this amplifying means. In addition to amplifying signals both incoming to and outgoing from the master equipment, the master equipment amplifying means may also be arranged to be operable as an oscillator generating a tone frequency signal by connecting its input and output circuits together. This tone frequency signal may serve as a calling signal either in respect of the master equipment calling an extension equipment, or in respect of an extension equipment calling the master equipment, the interconnection of the input and output circuits of the amplifying means being effected in the former instance by contacts controlled by a ringing switch included in the master equipment and in the latter instance by contacts controlled by a calling relay which can be energised in the master equipment by the establishment of a line loop at the extension equipment.

Figure 2:
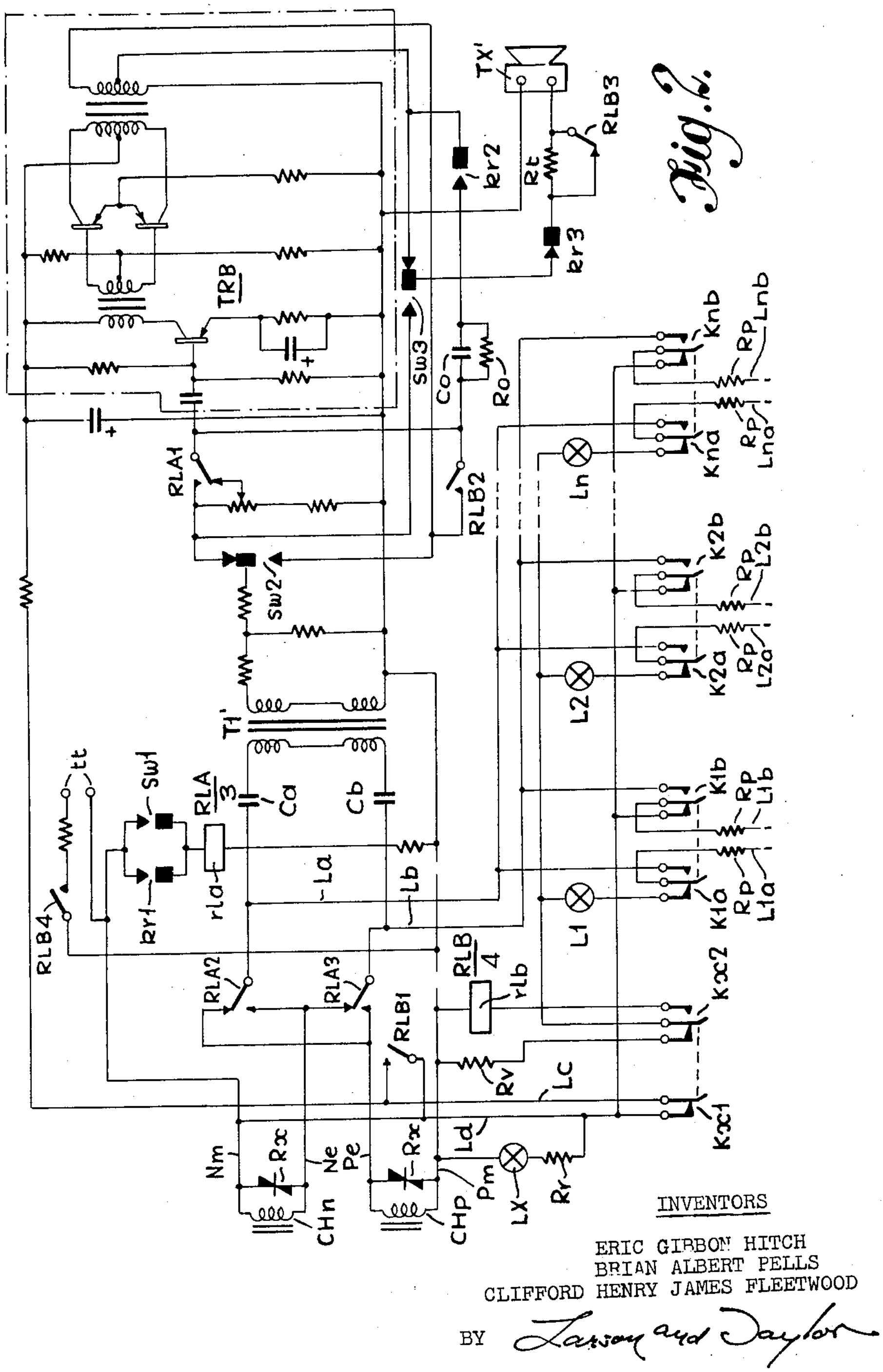

In order that the invention may be more fully understood a particular embodiment thereof will now be described with reference to the accompanying drawings in which:

FIG. 1 illustrates in conventional manner the circuit of an extension equipment; and FIG. 2 likewise illustrates the circuit of a master equipment suitable for controlling a number of extension equipments constituted as illustrated in FIG. 1.

Referring to the drawings, the extension equipment of FIG. 1 would in use be connected to a master equipment over a pair of line wires L1*a* and L1*b* which are used both for the transmission of A.C. intelligence signals between the equipments and for the supply of D.C. energy to the extension equipment from the master equipment. These lines are also used for the transmission of calling signals as will be described later. The D.C. energy is controlled by the master equipment to be of one polarity when that equipment is set for transmission and of the opposite polarity when it is set for reception. It will be assumed that the controlled polarities of the D.C. energy are such that the line wires L1*a* and L1*b* are respectively negative and positive when the master equipment is set for transmission, and are respectively positive and negative when it is set for reception. Other extension equipments such as shown in FIG. 1 may be likewise connected to the master equipment over respective pairs of line wires (L1*a*, L1*b*, L2*a*, L2*b* . . . L*na*, L*nb*, FIG. 2) for operation therewith on a similar basis.

Considering the extension equipment circuit shown in FIG. 1, line wires L1*a* and L1*b* are connected to the primary side of an input transformer T1, which has two primary winding *p*1 and *p*2 serially connected between the line wires L1*a* and L1*b* with an intervening rectifier bridge network RF of conventional form consisting of four rectifiers R*f*1–R*f*4. There is included in one arm of the rectifier bridge RF, in series with the rectifier R*f*1, make contacts *k*1 which, together with make contacts *k*2 ganged thereto, are controlled by a control switch (not otherwise represented) included in the extension equipment: the make contacts *k*1 and *k*2 are both open when the control switch is in a normal position and closed when it is in an operated position. Connected across input terminals *rt*1 and *rt*2 of the rectifier bridge RF is a series circuit comprising the energising winding *r*1 of a changeover relay RL, which constitutes the switching device controlled from the master equipment, a rectifier R*f*5, and the contacts *k*2. The rectifier R*f*5 permits current flow through the winding *r*1 and consequential operation of the relay RL, only when the line wire L1*a* is positive and the line wire L1*b* negative, that is, when the master equipment is set for reception. It is evident, however, that such current will flow only when the contacts *k*2 are closed.

Output terminals *rt*3 and *rt*4 of the rectifier bridge RF are connected to leads LN and LP which serve as negative and positive supply leads over which the D.C. energy received over the line wires L1*a* and L1*b* is extended to a transistor amplifier TRA. The amplifier TRA is normally connected for reception, but can be connected for transmission by means of change-over contacts RL1, RL2 and RL3 which are operated on operation of relay RL. The amplifier TRA and the manner in which it can be switched either for reception or transmission will be dealt with presently.

The bridge rectifiers R*f*1–R*f*4 are so poled that when the D.C. energy fed over the line wires L1*a* and L1*b* makes them respectively negative and positive (that is, when the master equipment is set for transmission) current can flow from the positive line wire L1*b* into the positive supply lead LP over the path: line wire L1*b*, primary winding *p*2, and rectifier R*f*3, and from the negative supply lead LN to the negative line wire L1*a* over the path: line wire L1*a*, primary winding *p*1 and rectifier R*f*4. The amplifier TRA will therefore be energised whenever the master equipment is set for transmission. When, however, the master equipment is set for reception, the line wire L1*a* being then positive and the line wire L1*b* negative, the current path between the negative line wire L1*b* and the supply lead LN is now by way of the primary winding *p*2 and the rectifier R*f*2, while the current path between the positive line wire L1*a* and the supply lead LP is by way of the primary winding *p*1, the rectifier R*f*1 and the contacts *k*1. Therefore at such times as the master equipment is set for reception, the contacts *k*1 must be closed before the amplifier TRA can be energised, that is the control switch requires to be in its operated position. Consequently it is not possible for the master equipment to listen-in to the extension equipment unless the control switch in the latter has been operated, thus giving protection against unsanctioned listening-in to the extension. Furthermore, since the relay RL can be operated only in response to D.C. energy received over the line wires L1*a* and L1*b* with polarity corresponding to the master equipment being set for reception, the result is obtained that, even though the control switch may be operated, the amplifier TRA is connected for transmission from the extension equipment only if the master equipment is set for reception. The amplifier TRA thus remains connected for reception at such times as the master equipment is set for transmission, the master equipment therefore controlling the direction of transmission.

Considering now the transistor amplifier TRA and its manner of operation. When the extension equipment is set for reception, circulation of A.C. intelligence signals transmitted by the master equipment, or of a tone frequency signal transmitted as a calling signal, takes place in a primary receiving circuit which follows the path: line wire L1*a*, primary winding *p*1, rectifier R*f*4, supply lead LN, a capacitor C1, supply lead LP, rectifier R*f*3, primary winding *p*2, to line wire L1*b*. The rectifiers R*f*3 and R*f*4 offer low impedance to the received signals, being at this time biased into conduction by the transmitting polarity of the received D.C. energy, while the capacitor C1 connected across the supply leads LP and LN has a large capacitance in order also to provide a low impedance path for the received A.C. signals while at the same time act as a filter which removes these A.C. signals and also any spurious switching pulses which may be received, from the D.C. energy as applied to the amplifier TRA over the supply leads LP and LN. From the primary windings *p*1 and *p*2 of the input transformer T1, the received A.C. signals are induced into serially connected secondary winding *s*1 and *s*2 thereof, whence they are applied to the base of an input transistor TR1 by way of an attenuation matching pad RP (comprising series resistors R*s*2 and R*s*3 and shunt resistor R*s*4), the relay contacts RL1 (unoperated), a potentiometer comprising a variable resistor R*s*5 and a fixed resistor R*s*6, the relay contacts RL2 (unoperated), and a capacitor C2. The base of the transistor TR1 is connected at the junction of two resistors R*s*7 and R*s*8 connected in series across the supply leads L*p* and LN, the base thus being biased to the potential of this junction, while the emitter of the transistor TR1 is connected to the positive supply lead LP through a resistor R*s*9 across which is shunted a capacitor C3 offering a low impedance return path to the received signals.

The collector of transistor TR1 is connected to the supply lead LN through the primary winding *p*3 of a transformer T2 by which the transistor TR1 is transformer-coupled to a push-pull output stage comprising two further transistors TR2 and TR3. The transformer T2 has a centre-tapped secondary winding *s*3 connected at its ends to the bases of transistors TR2 and TR3 respectively, and at its centre-tap to the junction of two resistors R*s*10 and R*s*11 connected in series across the supply leads LP and LN: the potential at this latter junction is applied through the appertaining half of the secondary winding *s*3 as a biasing potential for the bases of the two transistors TR2 and TR3. The emitters of the transistors TR2 and TR3 are connected together and through a resistor R*s*12 to the positive supply lead LP, while the collectors of these two transistors are connected to opposite ends of a centre-tapped primary winding *p*4 of an output transformer T3. The centre-tap of primary winding *p*4 is connected to the negative supply lead LN, thereby affording connection of this supply lead to the collectors of the transistors TR2 and TR3 through the respective halves of the winding *p*4. The output transformer T3 also has a tapped secondary winding *s*4 which is connected at one end, *a*, to the positive supply lead LP, at the other end, *b*, to the front contact of the relay contacts RL1, and at its tapping, *c*, through the relay contacts RL3 (unoperated) to an input terminal *ta* of an electro-acoustical transducer TX. A second input terminal *tb* of the transducer TX is connected directly to the positive supply lead LP.

With the extension equipment set for reception (as shown), the received signals as applied to the base of the input transistor TR1 are amplified by this transistor and passed to the push-pull transistors TR2 and TR3 for further amplification, after which they are extended to the transducer TX, effectively connected across the portion *ac* of the secondary winding *s*4 of the transformer T3.

When the extension equipment is set for transmission, namely when the relay RL is operated, the contacts RL1 connect the matching pad RP across the ends *a* and *b* of the secondary winding *s*4 of the output transformer T3, contacts RL2 render the potentiometer comprising resistors R*s*5 and R*s*6 ineffectual, and contacts RL3 disconnect the transducer TX from the secondary winding *s*4 and connect it instead through the now operated contacts RL2 to the capacitor C2 at the base of the input transistor TR1. In order to prevent switching noises from reaching the transducer TX, the contacts RL3 should change over before the contacts RL1 and RL2 do so. Thus in this condition of the extension equipment, A.C. intelligence signals produced by the transducer TX are applied through the operated contacts RL2 (by-passing the potentiometer R*s*5, R*s*6) to the amplifier TRA, and after amplification appear in the output transformer secondary winding *s*4. From there, they are applied through the now operated contacts RL1 and the resistance pad RP to the windings *s*1 and *s*2 of the input transformer T1, whence by induction into the windings *p*1 and *p*2 of this transformer, they are transmitted over the line wires L1*a* and L1*b* to the master equipment. As will be appreciated, when the extension equipment is thus set for transmission the windings *s*1 and *s*2 of transformer T1 serve as primary windings and the windings *p*1 and *p*2 serve as secondary windings.

Turning now to FIG. 2, the circuit of the master equipment shown therein includes a transistor amplifier TRB which is similar to the amplifier TRA just described and like it can be switched to amplify either received signals or signals to be transmitted. In this instance, however, the switching of the amplifier TRB from a receiving function to a transmitting function is effected by means of switch contacts *sw*1, *sw*2 and *sw*3 controlled by a receive/transmit switch (not otherwise represented), in conjunction with change-over relay contacts RLA1 controlled by a switching relay RLA and corresponding to the relay contacts RL2 in FIG. 1. The contacts *sw*2 and *sw*3 correspond in function to the relay contacts RL1 and RL3 in FIG. 1. The relay RLA also has two polarity reversing contacts RLA2 and RLA3 which according to their condition (unoperated or operated) determine the polarity of the D.C. energy as applied to the pairs of line wires L1*a* L1*b*, L2*a* L2*b* . . . L*na*, L*nb*, connecting the master equipment to respective extension equipments.

The line wire pairs L1*a* L1*b*, L2*a* L2*b* . . . L*na* L*nb*, are connected through padding resistors R*p*, which serve to match each pair of line wires to, say, 300 ohms, to the moving contacts of respective pairs of change-over contacts K1*a* K1*b*, K2*a* K2*b* . . . K*na* K*nb*, which pairs are controlled by respective extension keys, push-buttons or other such switches, not otherwise represented. The master equipment also includes a cancellation switch having break contacts K*x*1 and change-over contacts K*x*2, and a ringing switch having make contacts *kr*1 and *kr*2, and break contacts *kr*3. Preferably, the extension switches and the cancellation switch are mechanically coupled (in some known manner not shown), such that operation of an extension switch causes release of the cancellation switch, while operation of this latter switch causes release of any operated extension switch. Thus although in FIG. 2 the cancellation switch contacts K*x*1 and K*x*2 are shown as being unoperated (as are the extension switch contacts), they will be assumed normally to be operated and to assume their unoperated position on operation of one of the extension switches. The ringing switch operates its contacts independently of the cancellation switch and the extension switches.

The master equipment is supplied with D.C. energy over positive and negative supply leads P*m* and N*m* which may for instance be connected to receive as the D.C. energy the rectified output from a suitable A.C. source. Secondary positive and negative supply leads P*e* and N*e* are respectively connected to the supply leads P*m* and N*m* by way of respective choke coils CH*p* and CH*n*, these leads P*e* and N*e* serving to extend the D.C. energy, through the polarity reversing relay contacts RLA2 and RLA3, to further leads L*a* and L*b* of which the lead L*a* is connected in common to the back contact of each of the contacts K1*a*, K2*a* . . . K*na*, while the lead L*b* is connected in common to the back contact of each of the contacts K1*b*, K2*b* . . . K*nb*.

Examination of the circuit will show that when the relay contacts RLA2 and RLA3 are unoperated, the lead P*e* is connected to the lead L*a* through the contacts RLA2 and the lead N*e* is connected to the lead L*b* through the contacts RLA3, whereas when these contacts are operated (relay RLA energised) they connect the lead P*e* to the lead L*b* and the lead N*e* to the lead L*a*. In consequence, when a pair of extension key contacts (say K1*a* and K1*b*)

are operated the line wires L1*a* and L1*b* become respectively positive and negative if the relay RLA is unoperated and respectively negative and positive if this relay is operated. The leads L*a* and L*b* also serve to carry A.C. intelligence between the amplifier TRB and the extension key contacts K1*a* K1*b*, K2*a* K2*b* . . . K*na* K*nb*, and the function of the choke coils CH*p* and CH*n* is to prevent A.C. signals from reaching the supply leads P*m* and N*m*. Each of these choke coils has connected across it a non-linear impedance element R*x*, such as that known by the Registered Trade Mark "Metrosil," which offers a low impedance to induce voltages built up across the appertaining choke-coil when the polarity of the D.C. energy as applied to the leads L*a* and L*b* is reversed by the relay contacts RLA2 and RLA3. Capacitors C*a* and C*b* are provided in order to prevent the D.C. energy from reaching the input transformer, T1′, of the amplifier TRB.

The master equipment also includes: a main indication lamp LX which is permanently connected across the supply leads P*m* and N*m* in series with a limiting resistor R*r*, thereby to provide a visual indication when these supply leads are carrying the D.C. energy; indication lamps L1, L2 . . . L*n* which pertain respectively to the several extension equipments connected to the master equipment and which give a visual indication whenever the appertaining extension is calling; and a calling relay RLB which controls four change-over contacts RLB1–RLB4 and is operated when an extension equipment calls the master equipment but only if the master equipment is not then in communication with another extension.

The operation of the master equipment is as follows: to connect a particular extension to the master equipment, which for the sake of description will be assumed to be the extension connected to the line wires L1*a* and L1*b*, the extension switch contacts K1*a* and K1*b* are operated. This results in the cancellation switch contacts, K*x*1 and K*x*2, assumed to be normally operated, being restored to their unoperated position shown, in which the make contacts K*x*1 interconnect two leads L*c* and L*d* and thereby connect the negative supply lead N*m* to the amplifier TRB to energise the latter, the positive lead P*m* being permanently connected to this amplifier. The change-over contacts K*x*2 are ineffective at this time. Following this, operation of the ringing switch causes the make contacts *kr*1, on closure, to complete an energising circuit for the energising winding *rla* of the relay RLA between the positive and negative supply leads P*m* and N*m*. Contacts RLA2 and RLA3 are thereby operated and result in D.C. energy being applied to the line wires L1*a* and L1*b* with polarity corresponding to the master equipment being set for transmission, that is, the line wire L1*c* becomes negative and the line wire L1*b* positive. Also, the ringing switch make contacts *kr*2, on closure, interconnect the input and output circuits of the amplifier TRB through a feedback circuit consisting of a resistance R*o* and a capacitor C*o*, thereby causing this amplifier to function as an oscillator transmitting a tone frequency calling signal to the extension equipment: the values of the resistor R*o* and the capacitor C*o* serve to determine the frequency of oscillation. During the time that the tone signal is being transmitted the ringing switch break contacts *kr*3 disconnect the transducer TX′ from the output of the amplifier TRB. Restoration of the ringing switch after a burst of tone signal has been transmitted re-sets the master equipment for reception and in releasing the relay RLA changes-over the contacts RLA2 and RLA3 to reverse the polarity of the D.C. energy as applied to the line wires L1*a* and L1*b*, that is, the polarity is now such as to permit transmission from the extension. The master equipment can then listen for an acknowledgement from the extension. The receive/transmit switch (*sw*1/2/3) is thereafter used to control the direction of transmission: the contacts *sw*2 and *sw*3 determine the connection of the amplifier TRB for transmission or reception as the case may be, and the contacts *sw*1, in the transmitting position of the receive/transmit switch causes operation of relay RLA so that the polarity of the D.C. energy as applied to the line wires L1*a* and L1*b* is such as to set the extension equipment for reception. In the receiving position of the receive/transmit switch, the relay RLA is unoperated and the polarity of the line wires is such as to permit the extension equipment to be set for transmission by operation of the control switch contacts *k*1, *k*2 (FIG. 1) thereat. It is evident that instead of using the ringing switch to call the attention of the extension, this may be done simply by operating the receive/transmit switch and making some distinctive sound, for example speaking or whistling, which will be picked up by the transducer TX′ and transmitted to the extension.

When it is required to call the master equipment from the extension equipment of FIG. 1, the control switch in the latter is operated and its make contacts *k*1 loop the line wires L1*a* and L1*b* at the extension equipment. In the master equipment a connection exists, on the one hand, between the line wire L1*b* and the positive supply lead P*m* by way of switch contacts K1*b* (unoperated) and the lead L*d*, and on the other hand, between the line wire L1*a* and the negative supply lead N*m* by way of switch contacts K1*a* (unoperated), the indication lamp L1, the cancellation switch contacts K*x*2 (normally operated) and the energising winding *rlb* of the relay RLB. These two connections are therefore joined by the loop at the extionsion equipment so as to complete a circuit for the D.C. energy, thereby causing operation of the relay RLB and the lighting of the lamp L1. The lamp L1 gives a visual indication that the extension is calling, and in addition the relay contacts RLB1 interconnect the leads L*c* and L*d*, thereby completing the energising circuit for the amplifier TRB in the same manner as do the cancellation switch contacts K*x*1, when operated, while the relay contacts RLB2 interconnect the input and output circuits of the amplifier TRB to cause it to function as a tone generating oscillator as already described: in this instance the resistor R*o* and the capacitor C*o* are by-passed, so that the generated tone is different in fraequency from that generated when the master equipment is calling. The tone signal generated by the amplifier TRB is fed to the transducer TX′ by way of the switch contacts *sw*3 (unoperated), the ringing switch contacts *kr*3 (unoperated), and a limiting resistor R*t*, to produce an audible calling signal in addition to the visual signal produced by the relevant lamp (L1). Normally the resistor R*t* is shunted by the relay contacts RLB3, but in the condition just described, these contacts are opened so that the level of the tone signal applied to the transducer TX′ is reduced. It may be desirable to have some means remote from the master equipment of indicating when an extension equipment is calling. To this end a remote indicator such as a lamp or a buzzer (not shown) may be connected to terminals *tt* which are energised by relay contacts RLB4, thereby to operate this indicator, when an extension calling condition obtains. In response to an indication that an extension is calling, the relevant extension switch is operated, causing restoration of the cancellation switch and thus release of the relay RLB. The master equipment can then be controlled by the receive/transmit switch as before. The cancellation switch contacts K*x*2 connect a resistance R*v* to the supply lead P*m* in place of the relay winding *rlb* so that another extension equipment looping the previously traced connection to call the master equipment while the latter is in use will light the relevant indicating lamp, but will not affect the amplifier TRB.

What we claim is:

1. In a communication system including a master equipment, at least one extension equipment, and a line connection interconnecting the master equipment with each extension equipment and serving to convey both A.C. intelligence signals between the master equipment and the extension equipment and also D.C. energy from the master equipment to the extension equipment, each extension equipment comprising amplifying means energisable by said D.C. energy and having two modes of operation, the one for amplifying incoming intelligence signals and the other for amplifying outgoing intelligence signals, the combination in each extension equipment of polarity sensitive means determining the mode of operation of said amplifying means according to the polarity of said D.C. energy, said polarity sensitive means permitting operation in the outgoing mode in response only to a particular polarity of said D.C. energy, and a control switch which, unless it is operated, prevents said polarity sensitive means from producing said outgoing mode of operation even if said energy has said particular polarity.

2. In a communication system including a master equipment, at least one extension equipment, and a line connection interconnecting the master equipment with each extension equipment and serving to convey both A.C. intelligence signals between the master equipment and the extension equipment and also D.C. energy from the master equipment to the extension equipment, each extension equipment comprising a transistor amplifier having input and output circuits, and said amplifier being energisable by said D.C. energy and having two modes of connection, the one for amplifying incoming intelligence signals and the other for amplifying outgoing intelligence signals, the combination in each extension equipment of a polarised relay which is operable by said D.C. energy in response only to a particular polarity thereof, change-over contacts controlled by said relay and effective on operation thereof to change the connection of said amplifier from its said one to its said other mode by appropriate switching of its input and output circuits, and a control switch connected in series with said relay and effective, unless operated, to prevent operation of said relay in response to said particular polarity of the D.C. energy.

3. A communication system as claimed in claim 1, wherein the master equipment includes amplifying means which, like the amplifying means included in each extension equipment, has two alternative modes of operation, the one for amplifying incoming A.C. intelligence signals and the other for amplifying outgoing intelligence signals, together with a receive/transmit switch operable to select a particular mode of operation for said master equipment amplifying means, and polarity-reversing contacts controlled by said receive/transmit switch and connected to apply said D.C. energy to said line connection with the polarity appropriate to operation of the extension equipment amplifying means in the alternate mode to that selected at the master equipment.

4. A communication system as claimed in claim 3, wherein the master equipment amplifying means has input and output circuits and also has means for establishing between said output and input circuits a feedback interconnection converting said amplifying means into an oscillator for generating a tone frequency calling signal, said feedback interconnection establishing means including a ringing switch having contacts operable to establish said feedback interconnection in respect of the master equipment calling an extension equipment, and a calling relay having contacts operable to establish said feedback interconnection in respect of an extension equipment calling the master equipment each extension equipment having means for looping the line connection and said calling relay at the master equipment being connected for operation in response to such looping of the line connection.

5. A communication system as claimed in claim 2, wherein the master equipment includes a transistor amplifier which, like the transistor amplifier included in each extension equipment, has two alternative modes of connection, the one for amplifying incoming A.C. intelligence signals and the other for amplifying outgoing intelligence signals, together with a receive/transmit switch operable to select a particular mode of connection for said master equipment amplifier, and polarity-reversing contacts controlled by said receive/transmit switch and connected to apply said D.C. energy to said line connection with the polarity appropriate to connection of the extension equipment amplifier in the alternate mode to that selected for the master equipment amplifier.

6. A communication system as claimed in claim 2, wherein the master equipment transistor amplifier has input and output circuits and also has means for establishing between said output and input circuits a feedback interconnection converting said amplifier means into an oscillator for generating a tone frequency calling signal, said feedback interconnection establishing means including a ringing switch having contacts operable to establish said feedback interconnection in respect of the master equipment calling an extension equipment, and a calling relay having contacts operable to establish said feedback interconnection in respect of an extension equipment calling the master equipment, each extension equipment having means for looping the line connection and said calling relay at the master equipment being connected for operation in response to such looping of the line connection.

References Cited in the file of this patent

UNITED STATES PATENTS 2,802,055 Wildhagen -------------- Aug. 6, 1957